(12) United States Patent
Buchard et al.

(10) Patent No.: US 8,813,056 B2
(45) Date of Patent: Aug. 19, 2014

(54) PROFILE BASED OPTIMIZATION OF PROCESSOR OPERATING POINTS

(75) Inventors: Artur Tadeusz Buchard, Eindhoven (NL); Petr Kourzanov, Eindhoven (NL); Ger Kersten, Veldhoven (NL)

(73) Assignee: NXP B.V., Eindhoven (NL)

( * ) Notice: Subject to any disclaimer, the term of this patent is extended or adjusted under 35 U.S.C. 154(b) by 791 days.

(21) Appl. No.: 12/673,198

(22) PCT Filed: Aug. 13, 2008

(86) PCT No.: PCT/IB2008/053247
§ 371 (c)(1),
(2), (4) Date: Feb. 12, 2010

(87) PCT Pub. No.: WO2009/022302
PCT Pub. Date: Feb. 19, 2009

(65) Prior Publication Data
US 2011/0214022 A1    Sep. 1, 2011

(30) Foreign Application Priority Data
Aug. 15, 2007  (EP) .................................... 07114385

(51) Int. Cl.
*G06F 9/44*    (2006.01)
*G06F 9/45*    (2006.01)

(52) U.S. Cl.
USPC ............ 717/158; 717/127; 717/130; 717/151

(58) Field of Classification Search
CPC combination set(s) only.
See application file for complete search history.

(56) References Cited

U.S. PATENT DOCUMENTS 6,519,766 B1 *  2/2003  Barritz et al. ................. 717/130
6,735,758 B1    5/2004  Berry et al.
(Continued)

FOREIGN PATENT DOCUMENTS

| EP | 1331565 A1 | 7/2003 |
| GB | 2404264 A | 1/2005 |
| GB | 2 448 952 A | 11/2008 |
| WO | 94/15858 A | 7/1994 |

OTHER PUBLICATIONS

C.B. Lirakis and K.P. Bongiovanni; Automated Multibeam Data Cleaning and Target Dectection; 2000; IEEE; retrieved online on Apr. 4, 2014; pp. 719-723; Retrieved from the Internet: <URL:http://ieeexplore.ieee.org/stamp/stamp.jsp?tp=&arnumber=881336>.*

(Continued)

*Primary Examiner* — Thuy Dao
*Assistant Examiner* — Hanh T Bui

(57) ABSTRACT

A program is executed with a first programmable device (10). Device operating points such as power supply voltage and/or clock frequency are adapted dependent on the states reached by the device during execution. Operation of programs that may have been sold after the device has been supplied to users is optimized by executing the computer program on each of a plurality of programmable devices (10) like the first programmable device, and collecting statistical data associated with the execution states encountered during execution by the plurality of programmable devices (10). Each of the plurality of programmable devices (10) collects its own statistical data and uploads the collected information to a common profiling apparatus (14). The profiling apparatus assigns device operating points to respective ones of the execution states, using an optimization that depends on the combined statistical data from the plurality of programmable devices (10). Subsequently the device operating points of the first programmable device (10) are set in the respective execution states to the assigned device operating points.

16 Claims, 1 Drawing Sheet

(56) References Cited

U.S. PATENT DOCUMENTS

| | | | |
|---|---|---|---|
| 6,862,696 B1 | 3/2005 | Voas et al. | |
| 7,735,073 B1 * | 6/2010 | Kosche et al. | 717/158 |
| 7,788,644 B2 * | 8/2010 | Koduru et al. | 717/127 |
| 7,827,543 B1 * | 11/2010 | Kosche et al. | 717/158 |
| 8,032,875 B2 * | 10/2011 | Kosche et al. | 717/151 |
| 8,065,665 B1 * | 11/2011 | Kosche et al. | 717/127 |
| 8,166,462 B2 * | 4/2012 | Kosche et al. | 717/151 |
| 8,176,475 B2 * | 5/2012 | Kosche et al. | 717/130 |
| 8,230,059 B1 * | 7/2012 | Santos et al. | 709/224 |
| 8,640,114 B2 * | 1/2014 | Kosche et al. | 717/158 |
| 2002/0100025 A1 * | 7/2002 | Buechner et al. | 717/131 |
| 2004/0210877 A1 | 10/2004 | Sluiman et al. | |
| 2005/0125784 A1 * | 6/2005 | Yang et al. | 717/158 |
| 2006/0075286 A1 | 4/2006 | Hodge et al. | |
| 2007/0032992 A1 | 2/2007 | Trowbridge et al. | |
| 2007/0079353 A1 * | 4/2007 | Boortz | 725/135 |
| 2008/0109796 A1 * | 5/2008 | Kosche et al. | 717/158 |
| 2008/0127149 A1 * | 5/2008 | Kosche et al. | 717/158 |
| 2011/0138366 A1 * | 6/2011 | Wintergerst et al. | 717/130 |

OTHER PUBLICATIONS

Priya Nagpurkar et al.; Efficient Remote Profilling for Resource-Constrained Devices; Mar. 2006; ACM; retrieved online on Apr. 4, 2014; pp. 35-66; Retrieved from the Internet: <URL:http://delivery.acm.org/10.1145/1140000/1132465/p35-nagpurkar.pdf?>.*

Leonard Hart et al.; The Challenge in Balancing Data Collection Innovations, Remaining Practical, and Being Cost-Effective; Apr. 2012; Mathematica Policy Research Corp.; retrieved online on Apr. 4, 2014; pp. 3-13; Retrieved from the Internet: <URL: http://www.blaiseusers.org/2012/papers/01a.pdf>.*

European Search Report for EP Patent Appln. No. EP 10250113.7 (May 3, 2010).

Kotla, Ramakrishna, et al; Scheduling Processor Voltage and Frequency in Server and Cluster Systems; Parallel and Distributed Processing Symposium, 2005, Denver, CO, US; IEEE; Piscataway, NJ, US; Apr. 4, 2005; p. 1-8.

* cited by examiner

PROFILE BASED OPTIMIZATION OF PROCESSOR OPERATING POINTS

FIELD OF THE INVENTION

The invention relates to programmable data processing devices and in particular to the control of program execution by such devices.

BACKGROUND OF THE INVENTION

The computer hardware and programs can be optimized by the use of profiling. The term "profiling", as used in the art refers to gathering of statistical data concerning hardware use or program execution, such as counts of the number of times that an instruction or block of instructions from a program is executed. The statistical data is called a "profile". EP 1331565 describes a method of profiling execution of JAVA programs on a target machine and the use of the resulting profile to optimize the programs for subsequent use.

U.S. patent application No. 2006/75286 describes a method of "harvesting" profiles after computers have been provided to end users. This method involves locally generating profiles of hardware use on the computers, such as counts of the number of time the computers are switched on and off etc, and uploading the locally generated profiles to a central data base. As described in this document the harvested profiles can be used to realize improved designs of future computers, or to adapt the warranty of components like batteries etc. Unfortunately, the known profiling methods do not provide for improvement of programs after the programs have been supplied to end users other than by providing new releases of the programs. Known profiling is limited to pre-distribution improvement.

SUMMARY OF THE INVENTION

Among others, it is an object to provide for improved performance of computer programs after distribution to programmable devices of end users.

A method according to claim 1 is provided. Herein statistical data is gathered from program execution by a plurality of devices. The statistical data is uploaded from the plurality of devices to a common profiling apparatus where it is collected. The collected statistical data from a plurality of programmable devices is used to assign operating points to different execution states of the program. In an embodiment the operating points may define power supply voltages and/or clock frequencies of the programmable device that will be used in different states. The assignment of operating points may for example be performed centrally, in the common profiling apparatus and downloaded to the programmable devices, or in the programmable devices after downloading the collected data.

In an embodiment the data is collected after the programmable devices have been provided to different users, during executions of the program that are started and/or controlled by the user. In this way a broad range of characteristic operation conditions can be used to collect profile data. A plurality of programs that may be executed by the programmable devices may be handled in this way, collecting statistical data for specific different programs when they are executed at individual processing devices at different times and gathering the statistical data associated with the different programs.

BRIEF DESCRIPTION OF THE DRAWINGS

These and other objects and advantageous aspects will become apparent from a description of exemplary embodiments.

DETAILED DESCRIPTION OF EXEMPLARY EMBODIMENTS

Figure 1:
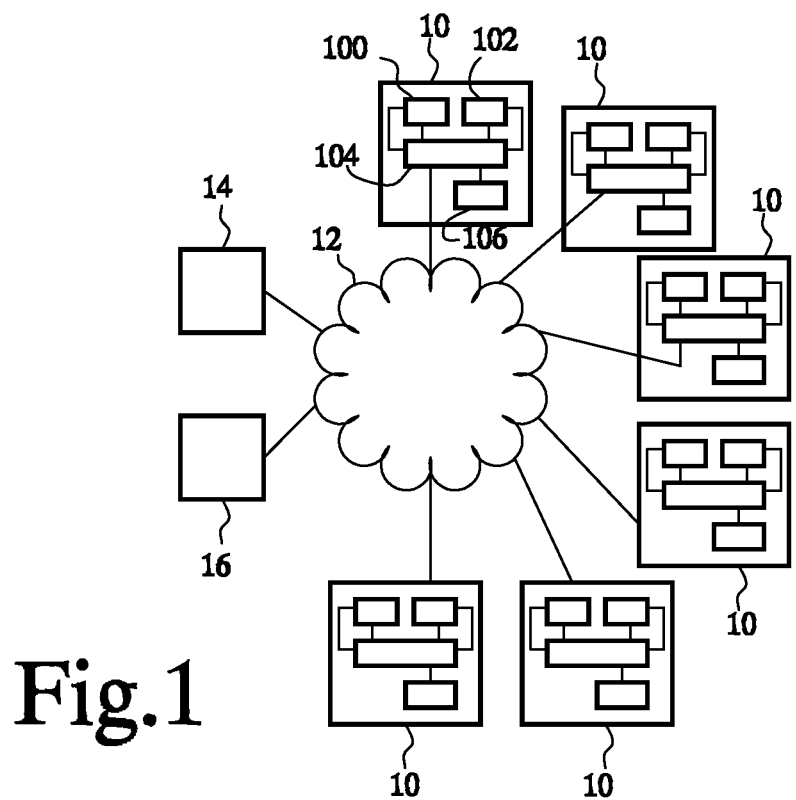
FIG. 1 shows a system with a plurality of programmable computers

FIG. 1 shows a system wherein power consumption during program execution is controlled using profile data from a plurality of programmable devices. The system comprises a plurality of programmable devices 10, a network 12, a profiling apparatus 14 and a program supply system 16. Programmable devices 10 are coupled to profiling apparatus 14 and program supply system 16 via network 12.

Each programmable device 10 comprises a power supply circuit 100, a clock circuit 102 and a processing circuit 104 with a power supply input coupled to power supply circuit 100 and a clock input coupled to clock circuit 102, as well as control outputs coupled to control inputs of power supply circuit 100 and clock circuit 102. Optionally, each programmable device 10 comprises a user interface 106, such as a group of buttons, or a touch screen interface etc, coupled to processing circuit 104. It should be appreciated that this arrangement is shown merely by way of example. In practice, each programmable device 10 may use a plurality of power supply voltages simultaneously, as well as a plurality of clock signals. Furthermore programmable device 10 may comprise a plurality of processing circuits that are coupled to receive mutually different supply voltages and clock signals, or mutually different combinations of a plurality of supply voltages and clock signals.

The combination (V, f) of power supply voltages V and frequencies f supplied to the one or more components of programmable device 10 is referred to as an operating point of the programmable device 10. Both processing capacity and power consumption depend on the operating point. Lowering clock frequencies and/or power supply voltages reduces power consumption. Lowering power supply voltage reduces the maximum usable clock frequency. Lowering a clock frequency reduces the amount of computation that can be performed in a time interval of a given duration. Setting of the operating point involves a compromise between achieving sufficient processing speed to perform a required task in a specified time and minimizing power consumption.

In operation new programs are distributed from program supply system 16 to programmable devices 10. This may be done via network 12 or via other routes. During execution of the programs programmable devices 10 vary the operating point in order to reduce power consumption. Execution involves successive transitions to a plurality of execution states. As used herein, an execution state may be characterized by a block of instructions in the program that is executed, parameter values of data parameters supplied for use in that block and optionally any other settings of the programmable device 10 that affect operation. Also a history of previously executed blocks of instructions may be part of the state.

In order to minimize power consumption, the operating point of the programmable device 10 is set according to the execution state of the programmable device. To select the operating point as a function of the execution state, a programmable device 10 needs to have information that relates states to operating points. The operating points that follow from the information should minimize power consumption, while ensuring that the program performs tasks within time intervals of predetermined duration. For refined power consumption control such information is needed for many states or even for a quasi continuum of states the definition of the state involves one or more quasi-continuous parameters. A considerable amount of information is needed to realize optimal control. This information is gathered using a plurality of programmable devices 10.

In this embodiment, the processing circuit 104 controls its own operation. Alternatively, a separate control circuit may be provided, with a memory containing information that links operating points to states, with an input coupled to the processing circuit, for monitoring the state of the processing circuit 104 and outputs coupled to the clock control circuit 102 and the power supply control circuit 10 for controlling the operating point dependent on the detected state of the processing circuit 104 and the link defined in the memory.

Figure 2:
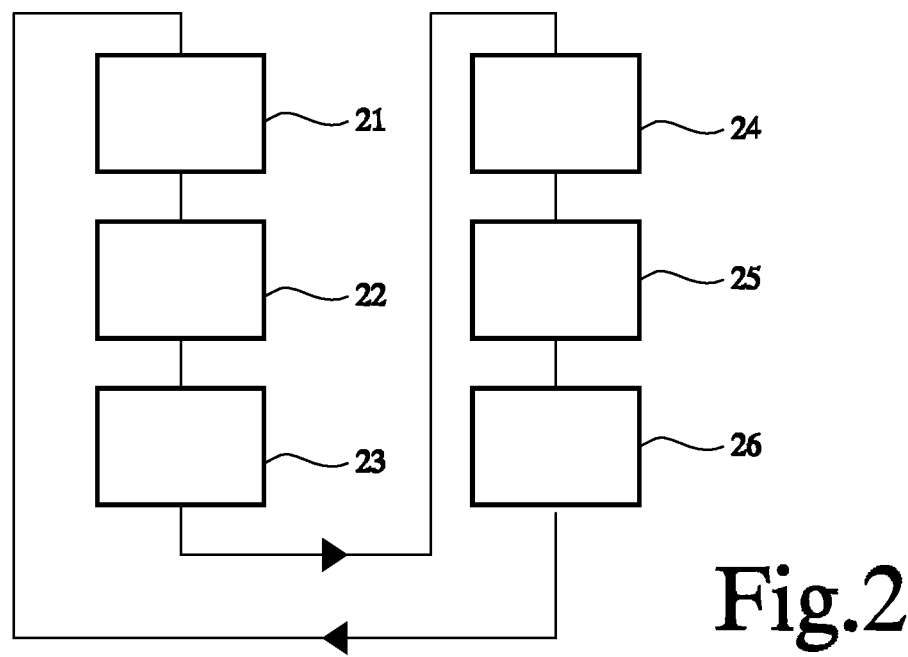
FIG. 2 shows a flow chart of program control

FIG. 2 shows steps involved in selection of operating points. In a first step 21 programmable devices 10 execute a program, and gathers profile data of the execution of the program. Different ones of programmable devices 10 need not execute this step simultaneously. In fact, usually each programmable device 10 may in fact execute different programs at different times dependent on user commands from user interface 106. The time points when execution is started and the way in which the program is executed may depend on actions by the particular used of the programmable device 10. Thus for example when the program causes the device to play video information, the selection of the video information, the play mode (normal play, trick play), the resolution etc, may depend on user commands from user interface 106.

At any time when a program is executed a programmable device 10 may gather profile data of the execution of that program. This may be done for all executions, or merely on a sample basis, for part of the executions. Gathering of data may be performed under software control, for example by means of commands in the executed program itself. Alternatively, programmable device may contain an application program interface that collects data when it is called by the program, or by an operating system that transfers control to parts of the program from time to time. The gathered profile data is statistical data, in the sense that it comprises counts of events that have occurred during program execution and/or statistics (averages, variances, and/or histograms etc.) of values detected during execution.

In a second step 22 programmable devices 10 send records containing identifications of the program and the relevant states and profile data for the program in that state to profiling apparatus 14. Different ones of programmable devices 10 need not execute this step simultaneously. The information about execution of a program may be sent immediately upon execution of the program, or data of a plurality of instances of execution may be gathered before transmission. The profile data may include an indication that the state has been reached, or a count of how many times the state was reached in a specified time interval, or the number of instruction cycles time needed to complete execution of a block of instructions in the state, or a successor state selected after leaving the state, or a history of prior states etc.

In a third step 23 profiling apparatus 14 collects the profile data from a plurality of programmable devices 10 for a program and its states. Collection may comprise collecting statistics for different states, such as the frequency with which the state is visited, the average or maximum number of instruction cycles before leaving the state, the probabilities of subsequent transitions to different states etc. Collection may also involve estimations of relations (e.g. coefficients of linear relations) between such quantities and quasi-continuous parameters whose values distinguish different states.

In a fourth step 24 profiling apparatus 14 computes a relation between states and operating points for the program from the collected information. Methods of selecting operating points from profile data are known per se and will therefore not be described in detail. In an exemplary embodiment, operating point selection involves an optimization criterion (expected power consumption) and constraints such as a maximum time duration needed to reach a first state from a second state. A set of operating points for a set of states is selected that optimizes the value of optimization criterion (minimizes expected power consumption) while satisfying the constraints. Herein the value of the optimization criterion and/or constrained values depend on the set of operating points in a way determined by the profile data, e.g. through the frequency at which a state is visited or the average durations of the time intervals during which the programmable device 10 remains in respective states, or the frequency with which a sequence of states occurs etc.

In a fifth step 25 profiling apparatus 14 transmits the computed relation between states and operating points for the program back to programmable devices 10. Subsequently, in a sixth step 26 programmable devices 10 set their operating points dependent on their state according to the transmitted relation. Different ones of programmable devices 10 need not execute this step simultaneously. Programmable devices 10 may set the operating points for example by executing corresponding instructions to output control signals to control power supply circuit 100 and clock input coupled to clock circuit 102. After this the process may repeat from first step 21 to realize further improvements.

As will be appreciated the effect of using a plurality of programmable devices 10 to gather profile data associated with programs is that data about all states, or nearly all states becomes available much sooner than when profile data is collected from only one programmable device 10. Furthermore it is made possible to optimize power consumption for programs that become available after programmable devices 10 have been manufactured. It should be appreciated that the flow chart of FIG. 4 is shown merely by way of example. Many variations are possible. For example, programmable devices 10 themselves may compute the relations between states and operating points, from profile data received from profiling apparatus 14. Furthermore, although an example of operating points determined by power supply voltages and clock frequencies has been illustrated, it should be appreciated that other aspects may be included in the operating point, such as a selection between alternative operating circuits that may be used to perform specific functions. Also, although an application to minimization of power consumption has been described, a similar technique may be applied to other minimization of other parameters, such as wear of parts like mechanical devices, flash memories etc. Profiling apparatus 14 itself may be another one of the devices, which itself also executed the program and collects data about that execution.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of executing a program with a first programmable device from a plurality of programmable devices, the method comprising:
   identifying a plurality of execution states of the program;
   executing the program on each of the plurality of programmable devices;
   collecting statistical data associated with the execution states encountered during execution by the plurality of programmable devices, said collecting being performed by each of the plurality of programmable devices;
   uploading the collected statistical data from the plurality of programmable devices to a common profiling apparatus;
   assigning device operating points to respective ones of the execution states, using an optimization that depends on a combination of the collected statistical data from the plurality of programmable devices; and
   setting device operating points of the first programmable device in the respective execution states to the assigned device operating points for the execution states during subsequent execution of the program by the first programmable device, including setting multiple different operating points for the first programmable device based upon the collected statistical data from all of the programmable devices, each operating point corresponding to a different execution state carried out by the first programmable device.

2. A method according to claim 1, wherein the device operating points define at least clock frequencies of the first programmable device in respective ones of the execution states.

3. A method according to claim 1, wherein the device operating points define at least power supply voltages of the first programmable device in respective ones of the execution states.

4. A method according to claim 1, the method comprising performing said assigning in the profiling apparatus and transmitting information defining the assigned device operating points to the first programmable device for controlling setting of the device operating points.

5. A method according to claim 1, the method comprising receiving user commands from user interfaces of the plurality of programmable devices, selecting, starting and/or controlling execution of the program dependent on the received user commands and performing said collecting for the execution that is selected, started and/or controlled dependent on the received commands, the statistical data obtained in response to different user commands being combined to assign the device operating points.

6. A method according to claim 1, comprising using each of the plurality of programmable devices to perform a plurality of different programs, the method comprising uploading the collected statistical data from the plurality of programmable devices to the profiling apparatus for respective ones of the programs in combination with identifications of the programs in which the execution states occur.

7. The method according to claim 1, wherein each of the plurality of execution states of the program indicates a respective block of instructions in the program.

8. The method according to claim 7, wherein each of the plurality of execution states of the program further indicates one or more parameter values provided to the respective block of instructions during execution of the program.

9. The method according to claim 8, wherein one or more of the plurality of execution states of the program further indicates one or more settings of the first programmable device.

10. A system comprising:
    a profiling apparatus;
    a plurality of programmable devices, each configured and arranged to execute a program and to collect statistical data associated with respective execution states encountered during execution of the program and to upload the collected statistical data from the plurality of programmable devices to the profiling apparatus; and
    at least one of the programmable devices being configured and arranged to set operating points during execution of the program to assigned operating points for said execution states, dependent on the execution state encountered by the at least one of the programmable devices, wherein the profiling apparatus and the at least one of the programmable devices are configured and arranged to select the assigned operating points, using an optimization that depends on a combination of the collected statistical data from the plurality of programmable devices, wherein the profiling apparatus and the at least one of the programmable devices are configured and arranged to select multiple assigned operating points of the at least one of the programmable devices, based upon the collected statistical data from all of the programmable devices, each operating point corresponding to a different execution state carried out by the at least one of the programmable devices.

11. A system according to claim 10, wherein the at least one of the programmable devices comprises a processing circuit for executing the program and a controllable clock source with an output coupled to a clock input of the processing circuit, the operating points defining control of a clock frequency of a clock signal provided by the controllable clock source.

12. A system according to claim 10, wherein the at least one of the programmable devices comprises a processing circuit for executing the program and a controllable power supply circuit with an output coupled to a power supply input of the processing circuit, the operating points defining control of a power supply voltage provided by the power supply circuit.

13. A system according to claim 10, wherein each of the plurality of programmable devices comprises a user interface for selecting, starting and/or controlling execution of the program dependent on user commands received from the user interface, the programmable devices being configured to perform said collecting for the execution that is selected, started and/or controlled dependent on the received user commands.

14. A programmable device comprising:
    an operating point control circuit;
    a processing circuit coupled to the operating point control circuit and configured and arranged to operate at an operating point set in the operating point control circuit, and to control setting of the operating point dependent on execution states encountered during execution of a program;
    an external interface configured and arranged to receive information defining the dependence of the operating points on the execution states; and
    the processing circuit being configured and arranged to collect statistical data associated with respective execution states encountered during execution of a program, to upload the collected statistical data to a profiling device outside the programmable device, and to operate at different operating points for the different execution states, wherein the operating point control circuit is configured and arranged to set respective operating points for each execution state of the processing circuit based upon the information received, via the external interface, defining the dependence of the operating points on the execution states for different processing circuits as indicated in the collected statistical data and statistical data collected at the different processing circuits.

15. A programmable device according to claim 14, comprising a controllable power supply circuit with comprising a controllable clock source with an output coupled to a clock input of the processing circuit, the operating points defining control of a clock frequency provided by the controllable clock source.

16. A programmable device according to claim 14, comprising a controllable power supply circuit with an output coupled to a power supply input of the processing circuit, the operating points defining control of a power supply voltage provided by the power supply circuit.

* * * * *